US009871407B2

(12) United States Patent
Nielsen et al.

(10) Patent No.: US 9,871,407 B2
(45) Date of Patent: Jan. 16, 2018

(54) WIND TURBINE GENERATORS

(75) Inventors: Jesper Nielsen, Risskov (DK);
Kenneth G. Hansen, Kjellerup (DK)

(73) Assignee: VESTAS WIND SYSTEMS A/S,
Aarhus N (DK)

( * ) Notice: Subject to any disclaimer, the term of this patent is extended or adjusted under 35 U.S.C. 154(b) by 295 days.

(21) Appl. No.: 14/416,328

(22) PCT Filed: Jul. 23, 2012

(86) PCT No.: PCT/DK2012/050276
§ 371 (c)(1),
(2), (4) Date: Jul. 23, 2015

(87) PCT Pub. No.: WO2014/015872
PCT Pub. Date: Jan. 30, 2014

(65) Prior Publication Data
US 2015/0364949 A1    Dec. 17, 2015

(51) Int. Cl.
*H02J 9/06*        (2006.01)
*F03D 7/02*        (2006.01)
*G05B 11/01*       (2006.01)
*F03D 9/25*        (2016.01)

(52) U.S. Cl.
CPC .............. *H02J 9/061* (2013.01); *F03D 7/026* (2013.01); *F03D 7/0264* (2013.01); *F03D 9/255* (2017.02); *G05B 11/01* (2013.01); *F05B 2270/10711* (2013.01); *F05B 2270/337* (2013.01); *Y02E 10/723* (2013.01); *Y10T 307/344* (2015.04)

(58) Field of Classification Search
CPC ......... Y02E 10/723; F05B 2270/10711; F05B 2270/337; F03D 9/255; H02J 9/061
See application file for complete search history.

(56) References Cited

U.S. PATENT DOCUMENTS

2010/0253079 A1    10/2010    Bolln et al.

FOREIGN PATENT DOCUMENTS

| DE | 102010056458 A1 | 7/2012 |
|---|---|---|
| EP | 2400149 A1 | 12/2011 |

OTHER PUBLICATIONS

International Search Report for PCT/DK2012/050276, dated May 24, 2013.

*Primary Examiner* — Rexford Barnie
*Assistant Examiner* — Terrence Willoughby
(74) *Attorney, Agent, or Firm* — Patterson + Sheridan, LLP

(57) ABSTRACT

A wind turbine generator (WTG) is connected to an electricity grid via a switchgear. A control system disconnects the WTG from the grid in the event of a fault and also if the grid voltage falls below its normal value for a predetermined time, to prevent the WTG from being connected when the control system is not functional. A back-up generator is started manually to recharge a battery and supply power to the control system. When the control system is fully functional, the WTG is manually re-connected to the grid. Alternatively, the control system enters a sleep mode during which the grid voltage continues to be monitored. When the grid voltage returns, the control system reverts to its wake mode and draws sufficient power from the battery to become fully functional, at which point the WTG is re-connected to the grid.

20 Claims, 2 Drawing Sheets

WIND TURBINE GENERATORS

FIELD

The present invention relates to wind turbine generators and in particular to methods of connecting and disconnecting such generators from the mains electricity grid supply.

BACKGROUND

Wind turbine generators are normally connected to the grid by means of high-voltage switchgear. Associated with each wind turbine generator are auxiliary circuits powered by a low-voltage electricity supply, which is typically derived from a transformer connected to the high-voltage grid.

The auxiliary circuits include various protection arrangements for ensuring safe operation of the wind turbine generator, such as arc detection circuitry, switchgear protection relays and other safety relays, such as those manufactured by Pilz Automation Technology. In the event of a dangerous condition, such as a fire hazard, the auxiliary circuits can disconnect the wind turbine generator from the grid by opening the high-voltage switchgear.

When the voltage in the grid falls below a predetermined level, it is no longer possible for the grid to supply power to the auxiliary circuits. For this reason, wind turbine generators are normally provided with an auxiliary low-voltage power source which is arranged to supply the auxiliary circuits with power in the event that the voltage in the grid falls below its normal level. In practice, the auxiliary low-voltage power source is connected to the auxiliary circuits, and during normal operation the power source is itself supplied with power from the grid via the transformer.

The auxiliary low-voltage power source is typically in the form of an uninterruptable power source (UPS) which includes a rechargeable battery and associated circuitry.

The associated circuitry normally functions only when above a predetermined temperature, which is typically 0° C. For this reason, the UPS is normally supplied with a heater for maintaining the temperature of the associated circuitry above this level.

In the event of the grid voltage falling below its normal level, the auxiliary power source can supply power to the auxiliary circuits for only a limited time. When the voltage in the grid returns to its normal level, there can be a significant delay before the auxiliary circuits become fully functional. At normal temperatures, this delay can be approximately 20 seconds. However, at low temperatures, such as those which may be encountered by wind turbine generators located in cold climates, a further delay results from the need for the heater to raise the temperature of the UPS circuitry to its operational level. Depending on the local ambient temperature, the auxiliary circuits can remain unpowered for up to 1 hour. As a result, the main circuitry of the wind turbine generator will be unprotected during this time.

The Applicant has appreciated that it would be desirable to provide an arrangement which overcomes, or at least mitigates, this problem.

SUMMARY

Thus, in accordance with a first aspect of the present invention there is provided a method of disconnecting a wind turbine generator (WTG) from an electricity grid in the event of power loss in the grid and subsequently reconnecting the WTG to the grid after the grid regains power, wherein the WTG comprises one or more auxiliary circuits, the method comprising:

(a) detecting when the power in the grid falls below a predetermined level for more than a predetermined time;

(b) in response thereto, disconnecting the wind turbine generator from the grid;

(c) detecting a return of power to the grid;

(d) in response thereto, supplying power to the auxiliary circuits;

(e) determining when the powered auxiliary circuits are functional; and (f) in response thereto, reconnecting the wind turbine generator to the grid.

With such a method, the wind turbine generator remains disconnected from the grid whenever the auxiliary circuits are not functional, thereby ensuring that the main circuits of the wind turbine generator remain protected at all times.

Although it would be possible for power to be supplied to the auxiliary circuits in step (d) directly from the grid, it is preferred that the wind turbine generator comprises an auxiliary power supply, and that method step (d) comprises connecting the auxiliary power supply to the auxiliary circuits. The reason for this is that the high-voltage switchgear which connects the wind turbine generator to the grid is positioned between the grid and the transformer, and so when the switchgear is open, the transformer is disconnected to the grid and so it would not be possible to obtain a source of low-voltage power for the auxiliary circuits from the grid without the provision of a further transformer.

In one embodiment of the present invention, steps (d), (e) and (f) are performed manually. However, this requires service personnel to access the circuitry in the tower which supports the wind turbine generator, which, in the case of off-shore wind turbines, could be inconvenient.

It is therefore preferred that the entire method is performed automatically by a control system.

The present invention extends to apparatus for disconnecting a wind turbine generator (WTG) from an electricity grid in the event of power loss in the grid and subsequently reconnecting the WTG to the grid after the grid regains power, wherein the WTG comprises one or more auxiliary circuits, the apparatus comprising:

(a) means for detecting when the power in the grid falls below a predetermined level for more than a predetermined time;

(b) means responsive thereto for disconnecting the wind turbine generator from the grid;

(c) means for detecting a return of power to the grid;

(d) means responsive thereto for supplying power to the auxiliary circuits;

(e) means for determining when the powered auxiliary circuits are functional; and (f) means responsive thereto for reconnecting the wind turbine generator to the grid.

The wind turbine generator preferably comprises an auxiliary power supply, and the means for supplying power to the auxiliary circuits comprises means for connecting the auxiliary power supply to the auxiliary circuits.

The apparatus may be in the form of a control system which is normally operable in a wake mode, but which adopts a sleep mode after disconnecting the wind turbine generator from the grid, and which subsequently reverts to the wake mode on detecting a return of power to the grid. The control system preferably uses substantially less power when in the sleep mode than when in the wake mode.

The control system may itself include the auxiliary circuits.

The auxiliary power supply may comprise a diesel generator or alternatively, or additionally, a battery, such as two standard lead-acid 12 V car batteries connected in series. By providing such an auxiliary power supply in place of the conventional UPS, there is then no need to wait for the UPS circuitry to attain its operating temperature following a return of the normal grid voltage.

Preferred embodiments of the invention will now be described with reference to the accompanying drawings, in which:

DETAILED DESCRIPTION

Figure 1:
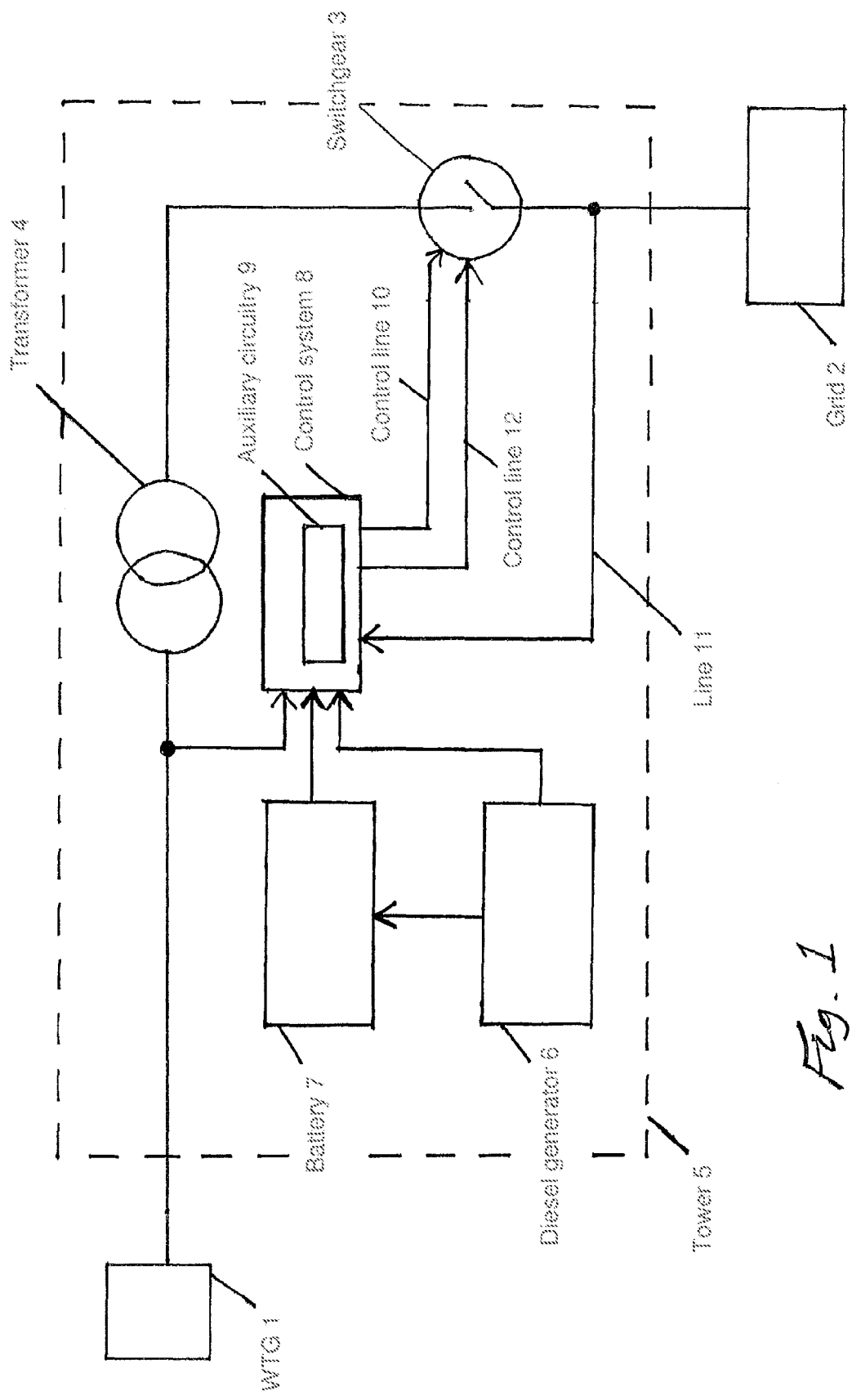
FIG. 1 is a diagrammatic representation of apparatus in accordance with a preferred embodiment of the present invention.

Reference is now made to FIG. 1, which illustrates schematically the apparatus of a preferred embodiment of the present invention. A wind turbine generator (WTG) 1 is normally connected to the mains electricity grid 2 by means of high-voltage switchgear 3. Since the operating voltage of the WTG 1 is less than the normal grid voltage $V_G$, a transformer 4 is arranged between the WTG 1 and the switchgear 3. The switchgear 3 and the remaining circuitry and the auxiliary power supplies of the WTG 1 are housed within the tower 5 of the WTG 1.

Thus, within the tower 5 are provided auxiliary low-voltage power supplies comprising a diesel generator 6, and a rechargeable battery 7 in the form of a series connection of two 12 V lead-acid batteries. The tower 5 also houses a control system 8 which includes auxiliary circuitry 9.

The auxiliary circuitry 9 itself comprises safety systems such as arc detectors and other fault detection circuitry. In the event of a fault, the auxiliary circuitry 9 generates a trip signal on control line 10 to the switchgear 3 to disconnect the WTG 1 from the grid 2.

During normal operation, when the grid voltage $V_G$ is at its normal level, power is supplied to the control system 8 from the low-voltage side of the transformer 4. Thus the diesel generator 6 and battery 7 serve as a back-up power supply in the event that the grid voltage $V_G$ falls below its normal value at which time power can no longer be drawn from the grid 2.

The grid voltage $V_G$ is supplied along line 11 to the control system 8 where it is monitored. In the event of the grid voltage $V_G$ falling below a critical value $V_{TH}$, there will be insufficient voltage in the grid 2 to power the control system 8, and so the control system 8 draws sufficient power from the rechargeable battery 7 to maintain all of the safety functions of the auxiliary circuitry 8.

However, it will be appreciated that the battery 7 has only limited capacity and will not be able to supply the control system 8 with such power indefinitely. Thus, in the event of the grid voltage $V_G$ remaining below the critical value $V_{TH}$ for greater than a predetermined time $T_{TH}$, the control system 8 generates a trip signal on control line 10 as above so as to disconnect the WTG 1 from the grid 2. This prevents the WTG 1 from being connected to the grid 2 at a time when the control system 8 is not fully functional. The time $T_{TH}$ is selected such that there is still some residual power remaining in the battery 7.

In accordance with a first embodiment, the battery is expected to be able to supply sufficient power to the control system 8 for about 15 minutes, and so the above trip signal is generated after 11 minutes. This ensures that the control system 8 is fully functional up to the time at which the WTG 1 is disconnected from the grid 2. At this time maintenance personnel are alerted to the disconnection of the WTG 1 from the grid 2 and then enter the tower 5 of the WTG 1. The diesel generator 6 is then started manually, which both recharges the battery 7 and also supplies power directly to the control system 8. As soon as the auxiliary circuitry 9 of the control system 8 is fully functional, the switchgear 3 is operated manually so as to re-connect the WTG 1 to the grid 2.

In accordance with a second embodiment, the above trip signal is generated after 15 minutes, and the control system 8 then enters a "SLEEP" mode during which it consumes only minimal power supplied by the battery 7. In this mode, the control system 8 continues to monitor the grid voltage $V_G$. In the event that the grid voltage $V_G$ returns to a level above the threshold voltage $V_{TH}$, the control system 8 reverts to its normal "WAKE" mode and starts to draw sufficient power from the battery 7 for it to resume its full safety functions. As soon as these functions have resumed, the control system 8 generates a control signal on control line 12 to close the switchgear 3 so as to re-connect the WTG 1 to the grid 2. In this embodiment, the battery is designed to provide sufficient power to supply the control system 8 in the "WAKE" mode for up to 48 hours, and in the "SLEEP" mode for considerably longer.

Figure 2:
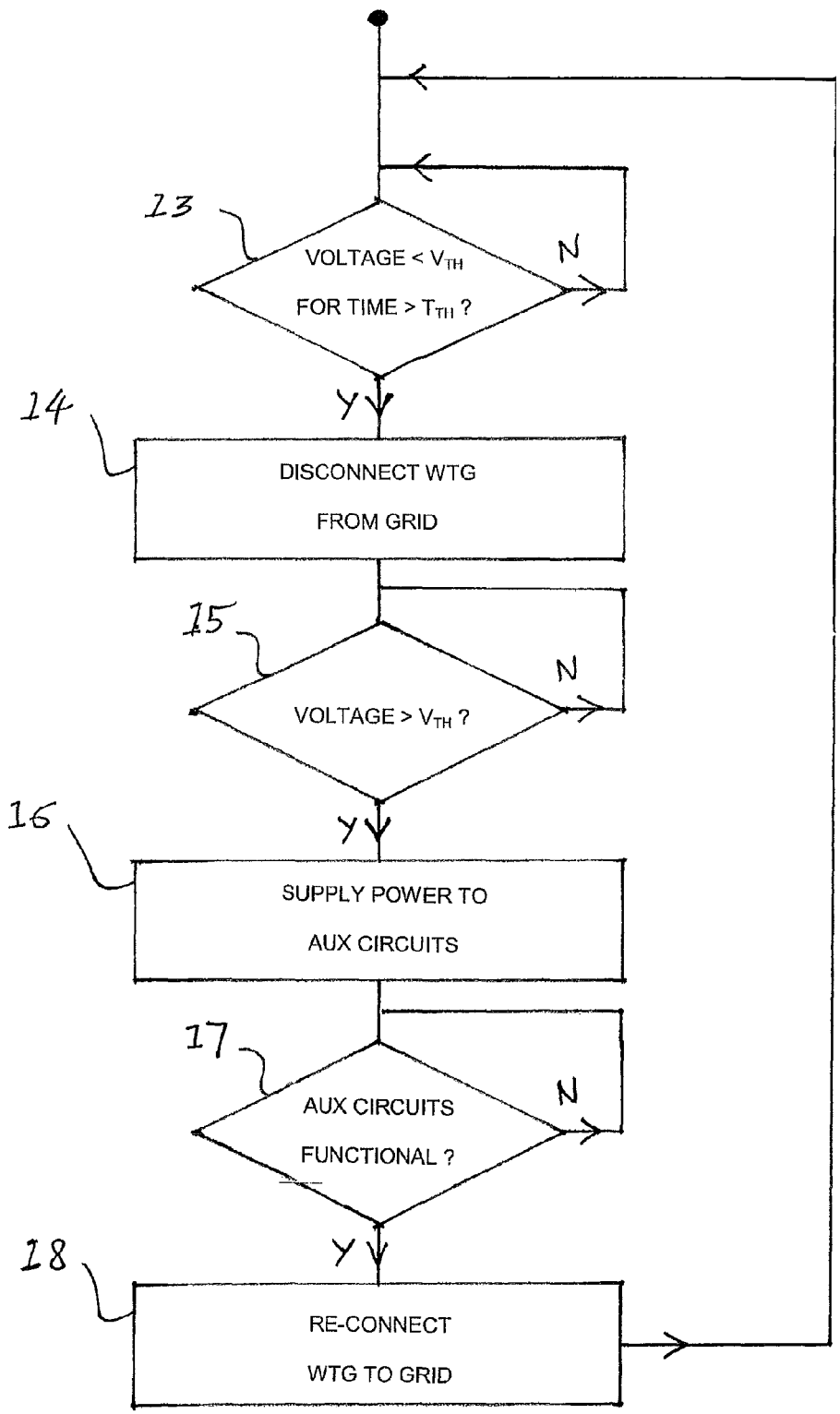
FIG. 2 is a flowchart illustrating a method in accordance with an embodiment of the present invention.

Referring to FIG. 2, which is a flowchart illustrating the method in accordance with a preferred embodiment of the present invention, the method starts with decision step 13, at which it is determined as to whether the grid voltage $V_G$ has fallen below a threshold value $V_{TH}$ for greater than a threshold time $T_{TH}$. If NO, the method returns to decision step 13 to continue monitoring the grid voltage $V_G$. If YES, the wind turbine generator 1 is disconnected from the grid 2 at step 14. The grid voltage $V_G$ is then monitored once again to determine in decision step 15 as to whether the grid voltage $V_G$ has returned to a level above $V_{TH}$. If NO, then the method returns to decision step 15 to continue monitoring the grid voltage $V_G$. If YES, then power is supplied to the auxiliary circuitry 9 in step 16. The method proceeds to decision step 17 where it is determined as to whether the auxiliary circuitry 9 is functional. If NO, the method returns to decision step 17 to continue monitoring the auxiliary circuitry 9. If YES, then the method proceeds to step 18 at which the wind turbine generator 1 is re-connected to the grid 2.

It will be appreciated that variations of the embodiments may be made without departing from the scope of the invention which is defined solely by the claims. For example, although in the preferred embodiments there is no uninterruptable power supply, it would be possible to incorporate such a UPS, in which case power could be supplied to the UPS from the auxiliary power supply.

Furthermore, although in the preferred embodiments described above, the auxiliary circuitry and the auxiliary power supplies are located within the tower of the wind turbine generator, it would be possible to house some or all of these components in the nacelle of the wind turbine generator. As a further alternative, the switchgear and/or transformer could be located outside the tower.

What is claimed is:

1. A method of operating a wind turbine generator (WTG) configured to selectively connect to an electricity grid, wherein the WTG comprises an auxiliary power supply and one or more auxiliary circuits, the method comprising:
   (a) disconnecting, using a control system coupled with the WTG, the WTG from the electricity grid in response to detecting a condition in which a grid voltage of the electricity grid is less than a predetermined level for more than a predetermined time;
   (b) transitioning the control system from a first mode into a second, low-power mode in response to detecting the condition;
   (c) in response to detecting a return of the grid voltage to at least the predetermined level, (i) transitioning the control system from the second mode to the first mode and (ii) connecting the auxiliary power supply to the one or more auxiliary circuits; and
   (d) in response to determining that the one or more auxiliary circuits are in a fully functional state, reconnecting the WTG to the electricity grid.

2. The method as claimed in claim 1, wherein the method is performed automatically by the control system.

3. The method as claimed in claim 1, wherein steps (c)(ii) and (d) are performed manually.

4. The method of claim 1, wherein disconnecting the WTG from the electricity grid comprises communicating a first control signal to a switchgear arranged between the WTG and the electricity grid.

5. The method of claim 1, further comprising:
   in response to detecting that the grid voltage is less than the predetermined level, and prior to disconnecting the WTG from the electricity grid, transitioning the one or more auxiliary circuits from being powered by the electricity grid to being powered by the auxiliary power source.

6. The method of claim 5, wherein transitioning the control system from a first mode into a second, low-power mode comprises:
   disconnecting the one or more auxiliary circuits from the auxiliary power source,
   wherein the control system is configured to monitor the grid voltage while in the second mode.

7. The method of claim 5, wherein the auxiliary power supply comprises a battery, and wherein the predetermined time is selected such that the battery retains a residual power.

8. The method of claim 7, wherein the auxiliary power supply further comprises a diesel generator configured to, responsive to disconnecting the WTG from the electrical grid, perform at least one of recharging the battery and powering the one or more auxiliary circuits.

9. The method of claim 1, wherein the one or more auxiliary circuits comprises at least one of an arc detector and fault detection circuitry.

10. A control system for operating a wind turbine generator (WTG) configured to selectively connect to an electricity grid, wherein the WTG comprises an auxiliary power supply and one or more auxiliary circuits, the control system comprising:
    means for monitoring a grid voltage of the electricity grid;
    means for disconnecting the WTG from the electricity grid in response to detecting a condition in which the grid voltage is less than a predetermined level for more than a predetermined time, wherein the control system is configured to transition from a first mode into a second, low-power mode in response to detecting the condition;
    means for connecting the auxiliary power supply to the one or more auxiliary circuits in response to detecting a return of the grid voltage to at least the predetermined level, wherein the control system is further configured to transition from the second mode to the first mode in response to detecting the return; and
    means for reconnecting the WTG to the electricity grid in response to determining that the one or more auxiliary circuits are in a fully functional state.

11. The control system of claim 10, wherein the first mode is a normal operation mode of the control system, and wherein transitioning into the second, low-power mode occurs responsive to disconnecting the WTG from the electricity grid.

12. The control system of claim 11, wherein the second, low-power mode comprises a sleep mode of the control system.

13. The control system of claim 11, wherein the control system comprises the one or more auxiliary circuits.

14. The control system of claim 10, wherein the auxiliary power supply comprises a diesel generator.

15. The control system of claim 10, wherein the auxiliary power supply comprises a battery.

16. The control system of claim 10, wherein the means for disconnecting the WTG from the electricity grid and the means for reconnecting the WTG to the electricity grid comprises a single switching means.

17. The control system of claim 16, wherein the single switching means comprises:
    a switchgear arranged between the WTG and the electricity grid, the switchgear responsive to control signals transmitted by the control system.

18. A non-transitory computer-readable storage medium having encoded thereon computer-executable instructions that, when executed by at least one computer processor, causes the at least one computer processor to carry out an operation comprising:
    disconnecting a wind turbine generator (WTG) from an electrical grid in response to detecting a condition in which a grid voltage of the electrical grid is less than a predetermined level for more than a predetermined time;
    transitioning from a first mode into a second, low-power mode in response to detecting the condition;
    in response to detecting a return of the grid voltage to at least the predetermined level, (i) transitioning from the second mode to the first mode and (ii) connecting an auxiliary power supply of the WTG to one or more auxiliary circuits of the WTG; and
    in response to determining that the one or more auxiliary circuits are in a fully functional state, reconnecting the WTG to the electrical grid.

19. A method of operating a wind turbine generator (WTG) configured to selectively connect to an electrical grid, the method comprising:
    responsive to determining that a grid voltage of the electrical grid is less than a predetermined level, transitioning one or more auxiliary circuits of the WTG from being powered by the electrical grid to being powered by an auxiliary power source of the WTG;
    responsive to determining that the grid voltage is less than the predetermined level for more than a predetermined time, disconnecting the one or more auxiliary circuits from the auxiliary power source;

responsive to determining that that grid voltage has returned to at least the predetermined level, reconnecting the auxiliary power supply to the one or more auxiliary circuits; and responsive to determining that the one or more auxiliary circuits are in a fully functional state, connecting the WTG to the electrical grid from an unconnected state.

20. A control system for a wind turbine generator (WTG), the control system comprising:

one or more computer processors configured to:
monitor a grid voltage of an electricity grid;
responsive to determining that the grid voltage is less than a predetermined level, transition one or more auxiliary circuits of the WTG from being powered by the electrical grid to being powered by an auxiliary power source of the WTG;
responsive to determining that the grid voltage is less than the predetermined level for more than a predetermined time, disconnect the one or more auxiliary circuits from the auxiliary power source;
responsive to determining that that grid voltage has returned to at least the predetermined level, reconnect the auxiliary power supply to the one or more auxiliary circuits; and
responsive to determining that the one or more auxiliary circuits are in a fully functional state, connect the WTG to the electrical grid from an unconnected state.

* * * * *